Aug. 15, 1967  E. J. JOHNSTON ETAL  3,336,052
SIDE DRAFT CONTROL MECHANISM
Filed Aug. 13, 1965  2 Sheets-Sheet 2
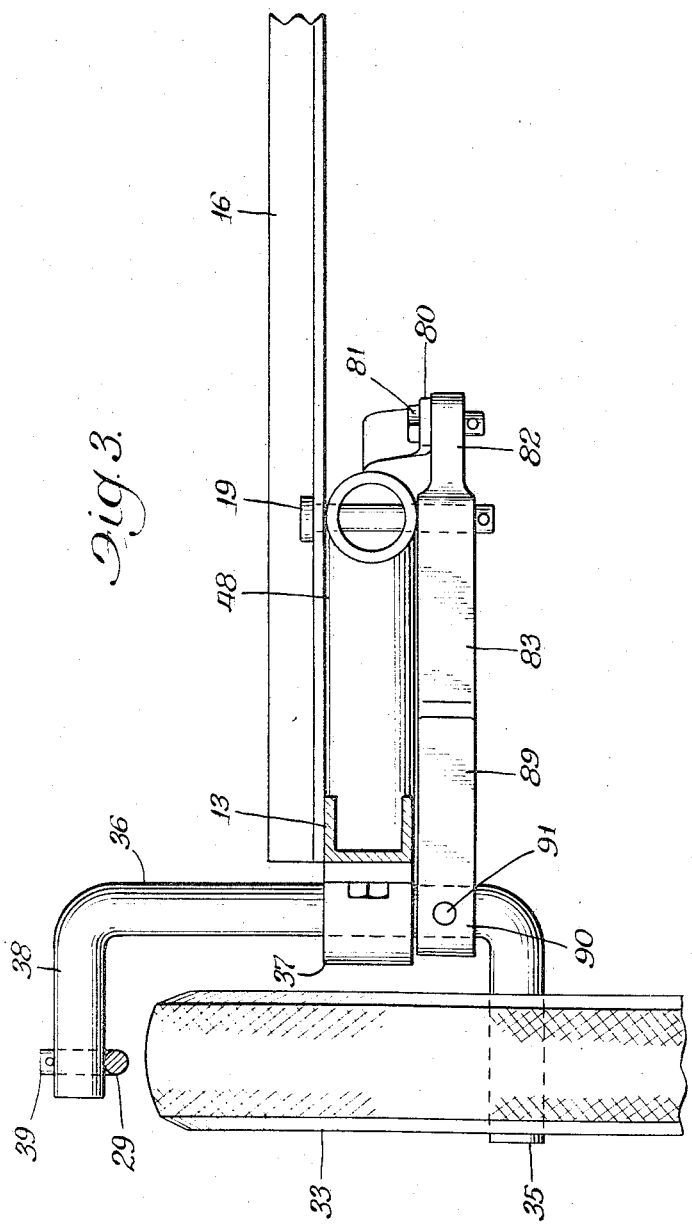
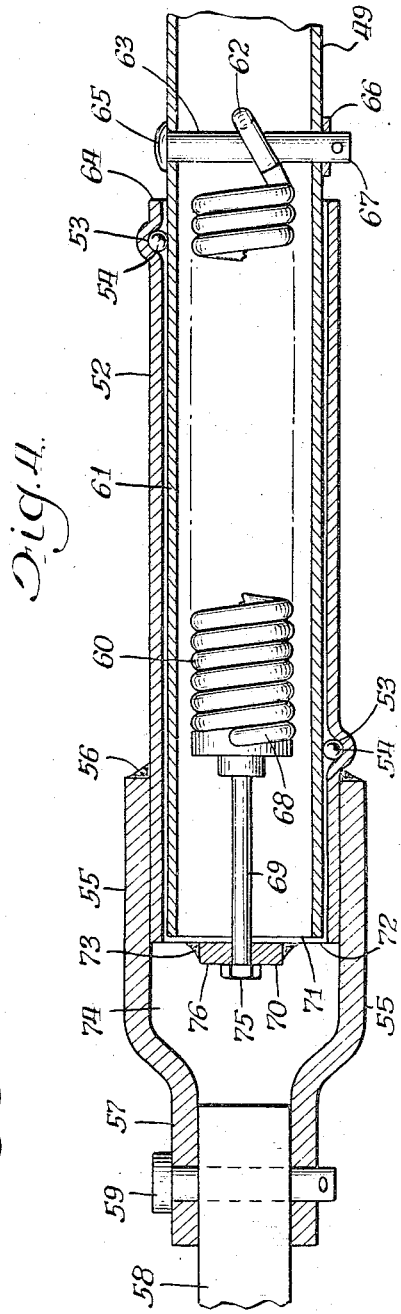
Inventors:
Edward J. Johnston
Peter J. Peacock
John J. Kowalik
Atty.

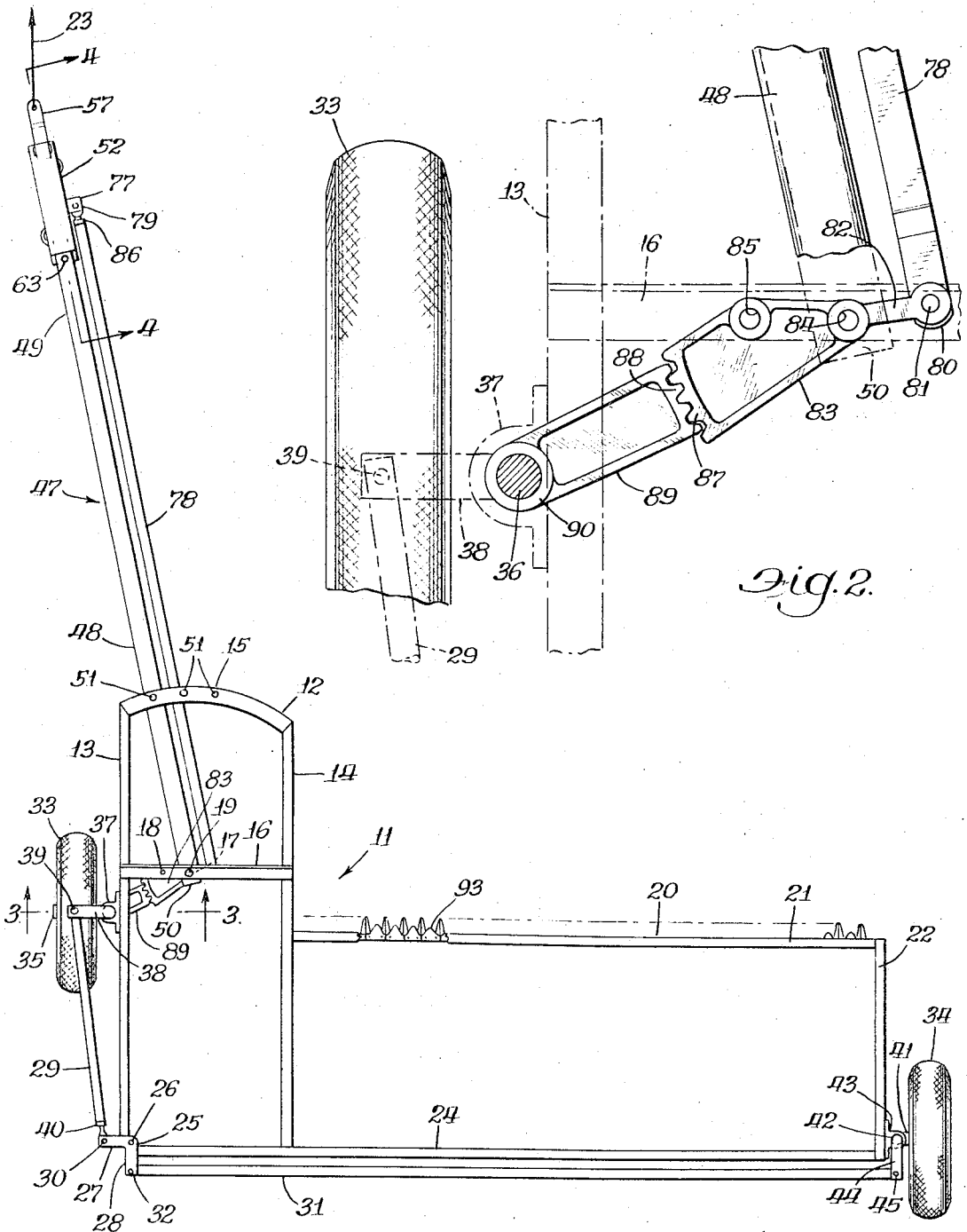

3,336,052
SIDE DRAFT CONTROL MECHANISM
Edward J. Johnston, La Grange, and Peter J. Peacock, Lisle, Ill., assignors to International Harvester Company, a corporation of Delaware
Filed Aug. 13, 1965, Ser. No. 479,496
10 Claims. (Cl. 280—472)

ABSTRACT OF THE DISCLOSURE

A side draft control linkage having gear sectors attached respectively to the wheels and to the draft tongue and causing the wheels to turn in one direction when the tongue is pulled and in the opposite direction when the machine is backed.

---

The present invention relates to drawn vehicle. Particularly the invention relates to a mechanism for controlling side drafts in trails, such as hitched portable farm implements.

Under certain harvesting conditions, what is referred to as an offset trail is employed as a portable conveyance for an implement or tool, such as, for example, an elongated cutter bar. In use, a conventional offset trail is drawn by a tractor to which the trail is connected by an elongated hitch. A trail has an elongated frame the longitudinal axis of which it is desired to maintain normal or perpendicular to the longitudinal axis of its tractor during harvesting. For portability, the trail mounts a pair of wheels on its opposite sides.

Because a tractor is offset with respect to the center of its trail, normal forces encountered during harvesting tend to cause the trail to rock from a desired perpendicular aspect relative to its tractor. Such rocking is referred to as a side draft, and results in harvesting inefficiencies. Conventionally, to compensate for the tendency of the trail to rock from its preferred attitude of normalcy to the direction of the path of harvest, the axles on which the trail wheels are mounted are slanted or sloped in a horizontal plane, whereby the disposition of the wheels is such that they create forces counteracting generally encountered harvesting side draft forces. However, conventionally, sloping disposition of such axles is fixed, and thereby limit the range of side draft counteracting forces, whereby the range of forces tending to cause side drafts cannot be effectively countered. As a consequence, conventional side draft controlling mechanisms are not entirely satisfactory.

What is required, of course, is a side draft control mechanism which precisely counteracts all forces tending to cause side drafts by creating counteracting forces of the same magnitude as the forces tending to cause side drafts. Thereby, no side draft, in fact, could occur over the entire range of forces tending to cause the same under operating conditions.

In accordance with the present invention, and as an object thereof, there is provided an improved side draft control mechanism.

Another object of the present invention is the provision of a side draft control mechanism adapted to exercise a counteracting or counterbalancing force for each force tending to create side draft.

It is an additional object of the present invention, in such a side draft control mechanism, to provide means whereby the magnitude of the counteracting or counterbalancing force is substantially the same as the magnitude of the force tending to cause side draft.

It is a further object of the present invention to provide a side draft control mechanism for a trail which is adapted to counteract side draft forces through a linkage connected to the wheels of the trail to turn the wheels in a direction and at an angle sufficient to cause forces which will hold the trail at a preferred attitude against side draft impelling forces.

It is yet a further object of the present invention to provide a side draft control mechanism having means for developing a force to counteract side draft and means for varying the magnitude of the counteracting force in proportion to the force tending to cause side draft.

Moreover, an object of the invention is the provision of a side draft control mechanism having means for translating the increased force of pull required by conditions causing side drafts into side draft countering forces, the magnitude of the countering forces being variable according to the variation of the forces tending to cause side drafts.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 1 is a top plan view of one embodiment of the present invention illustrating the same in use in connection with a portable farm implement.

FIG. 2 is an enlarged view looking at the top of that part of the embodiment shown at a lower left-hand portion of FIG. 1 and disposed below the trail.

FIG. 3 is a vertical sectional view taken substantially on the line 3—3 of FIG. 1 and looking in the direction of the arrows.

FIG. 4 is a vertical sectional view taken substantially on the line 4—4 of FIG. 1 and looking in the direction of the arrows.

Reference is now had more particularly to the drawings in which, for the purpose of orientation and to facilitate the instant description, it is noted that the directions left and right are relative to a view from behind the trail and looking forward. That is to say, for example, "left" with respect to the structures herein shown is to the left in FIG. 1, and "right" as regards said structures is to the right in FIG. 1.

As illustrated in FIG. 1, an enlarged framework generally designated 11 comprises what may be considered a portable farm implement or trail. The trail 11 is characterized by a left frame portion 12 which is elongated in a general fore-to-aft relationship, the frame portion 12 having left and right parallel side rails 13 and 14 and a curved or arcuate front rail 15. The frame portion 12 has a medial rail or angle bar 16 which extends transversely of the rails 13 and 14 to which the opposite ends of said angle bar 16 are rigidly secured by any conventional means. The angle bar 16 has a pair of apertures 17 and 18 which are adapted to permit operable mounting of a removable pivot pin 19 the function and manner of operation of which will become presently apparent. The pin 19 is shown in mounted position in the hole or aperture 17 in FIG. 3.

Trail or implement 11 is characterized by an offset or right frame portion 20 which is elongated normally to the longitudinal axis of the left frame portion 12. The offset frame portion 20 comprises an elongated front rail 21 and a right side rail 22, the left-hand limit of said offset frame portion 20 being the right side rail 14 from a medial part of which the front offset rail 21 extends to the right. The front offset rail 21 is shown in the instant embodiment as supporting or being disposed adjacent a farm tool in the form of a cutter bar 93 which is adapted for reciprocation by conventional means (not shown) from side to side as the trail is drawn forwardly, that is, drawn in a direction designated by arrow 23 in FIG. 1.

The left frame portion 12 and the offset frame portion 20 have a common rear frame rail 24 which extends across the back and defines the aft end of the trail or implement 11. A crank-like right angular bracket 25 is connected to the left aft end of the left frame portion 12 by means of a suitable pivot member 26. Said crank or bracket 25 has a pair of integral angularly disposed arms 27 and 28 which extend outwardly from pivot member 26 and from the left rear corner of the trail at right angles to each other.

The arm 27 provides in its outer end portion an anchor at which the aft end part of an elongated adjustable rod or link 29 is pivotally connected, as at 30. The outer or aft end portion of the arm 28 provides an anchor for an elongated force transmission rod or link 31 the left end portion of which is pivotally connected to said arm 28, as at 32 in FIG. 1. As illustrated in FIG. 1, the bracket 25 provides the means by which the pair of opposite or right and left trail wheels 33 and 34 are connected together through the rods or links 29 and 31.

As illustrated in FIGS. 1 and 3, the left wheel 33 is mounted on an axle 35. The axle 35 comprises the lower normal outward projection of a vertical rock shaft 36 which extends upwardly from said axle 35 through a vertically passaged journalling member 37. Journalling member 37 is rigidly secured by any suitable means such as welding or the like to a medial part of the left frame rail 13. The rock shaft 36 has an upper right angular or horizontal extension 38 which may be disposed in parallel relationship with the axle 35, the forward end portion of the elongated rod or link 29 being pivotally connected to the outer end portion of the angular extension 38 by suitable pivot means designated 39. The foregoing arrangement of parts disposes the left wheel 33 outwardly from the left side of the left frame portion 12 medially of the front rail 15 and the rear rail 24.

Furthermore, as the wheel 33 rocks about a vertical axis, the link 29 will be correspondingly rocked; that is to say, should the wheel 33 rock clockwise with respect to FIG. 1, the rod or link 29 will move forwardly, whereas should the wheel 33 move counterclockwise about a vertical axis, the link 29 will move rearwardly. To adjust the relationship between the angular disposition of the wheel 33 about the axis of shaft 36 with the angular disposition of the bracket 25 about pivot 26, a conventional length adjustment component 40, the construction of which is apparent to those knowledgeable in the art, may be provided at the aft end portion of the rod or link 29, whereby its length can be selectively varied.

As illustrated in FIG. 1, the right wheel 34 may be mounted adjacent the rear right corner of the offset frame portion 20. Wheel 34 is rotatable on an axle 41 which is integral with and extends angularly outwardly from a vertical rock shaft 42. The rock shaft 42 is journalled in a bearing member or block 43 which is suitably secured to the aft end portion of rail 22. The rock shaft 42 has an upper rearward horizontal extension 44 which is pivotally connected to the right end portion of the link or rod 31 by a pivotal connector 45.

By reason of the foregoing construction, movement of the wheel 34 about a vertical axis is translated into or causes corresponding movement of the link or rod 31, and, accordingly, of the bracket 25. Accordingly, the wheels 33 and 34 will rock together in the same angular directions under normal or ordinary harvesting conditions.

As the load on the offset trail portion 20 increases, side draft forces are generated which tend to cause the wheels 33 and 34 to rock about axes provided by shafts 36 and 42, respectively. With respect to the implement 11 herein illustrated, such forces would tend to cause the wheels 33 and 34 to rock counterclockwise in relation to FIG. 1 through arcs proportional to the increase in the load. Such rocking would cause the trail to shift so that the rail 21 and the cutter bar 93 carried thereby would not address the crop being harvested along a line perpendicular to the direction of the path of movement of the trail. Hence, harvesting inefficiencies would result. To obviate such occurrence, and to counteract or counterbalance the forces tending to cause side drafts, novel means including a dial hitch construction generally designated 47 in FIG. 1 is provided in accordance with the present invention.

Said hitch construction comprises an elongated tongue 48 having a forward end portion 49 which is projected forwardly from the curved frame member 15. The inner end 50 of the hitch 47 is disposed adjacent the transverse frame member 16 to which said hitch may be pivotally connected by means of the removable pin 19. Pin 19, which is removably projectable through the aperture 17 of the rail 16, is adapted to extend through the inner end portion 50 of the tongue 48. Thereby, the hitch 47 is rockable about the axis provided by the pin 19. Therefore, said hitch 47 can be secured in selected angular positions to the arcuate front rail 15 with an appropriate fastener (not shown) projected into the tongue 48 through a selected of apertures 51 in the forward frame member 15.

As illustrated in FIG. 4, the forward end portion 49 of the tongue 48 is tubular, having a forwardly telescoping section 61 which is slidable in a sleeve 52. If desired, to facilitate the telescopic action, the sleeve 52 may be provided with annular inwardly opening recesses 53 in which a ball bearing means 54 is mounted for engagement with the outer surface of the telescopic section 61. The aft end portions of a pair of opposed spaced apart connector straps 55 are secured to the fore end portion of sleeve 52 by welding or the like, as at 56. The forward hitch projection 57 of said connector straps is connectable to a tractor (not shown) by means of a link 58 to which said connector straps are releasably connected by a removable pivot member 59.

An expansion spring 60 coiled with its helical axis disposed longitudinally of the hitch 47 is mounted within the telescoping end portion 61 of the tongue 48. One end portion 62 of said spring 60 is anchored on a pin 63 which is rigidly secured diametrically of the tongue 48, spaced somewhat rearwardly of the aft end 64 of the sleeve 52. The head 65 of the pin 63 which is disposed adjacent the outer surface of the tongue 48, together with the boss 66 which is rigidly secured on a projection 67 of the pin 63 opposite the head 65, serves to hold pin 63 from diametric displacement and to limit forward movement of the tongue 48 into the sleeve 52.

The opposite or forward end portion 68 of the spring 60 is anchored to the rear end portion of an axially extending pin 69 which is projected outwardly from the forward end portion of the telescoping tongue section 61 and the forward end portion of the sleeve 52 disposed thereabout. A boss, strap or saddle 70 extends across the forward end openings 71 and 72 of the telescoping end portion 61 and the sleeve 52, as illustrated in FIG. 4. The opposite end portions of said boss, strap or saddle 70 are secured to the walls of the sleeve 52 by welding or the like, as at 73. The forward end portion of the spring-anchoring pin 69 is projected through said boss, strap or saddle into the space 74 provided or generated at the forward end of the tongue between connector straps 55. A nut 75 mounted on the threaded forward end portion of said pin 69, and adapted for engagement with the forward end surface 76 of said boss, strap or saddle 70, limits the rearward movement of the pin 69.

By reason of the foregoing construction, the application of a forward force tends to pull the sleeve 52 forwardly, and, accordingly, tends to stretch the spring 60 which would be pulled upon forward movement of the boss, strap or saddle 70 which would exert a forward force against the nut 75. A relative rearward force would tend to pull the tongue 48 rearwardly with respect to the sleeve 52, expanding the spring 61 by pulling rearwardly against the force of engagement of the nut 75 and the boss, strap or saddle 70.

As illustrated in FIG. 1, the sleeve 52 carries an outwardly extending anchor or lug 77 to which one end of an elongated rod or link 78 is adjustably connected by means of a pivot pin or the like 79. The link 78 extends longitudinally of the tongue 48, and, at its aft end portion 80, it is disposed substantially adjacent the rearward end portion 50 of the tongue 48, as illustrated in FIG. 2. The rearward end portion 80 of the link 78 is pivotally connected, as at 81, to an outwardly extending projection or ear 82 of a gear casting 83. The casting 83 has a pair of apertures 84 and 85 adapted for the accommodation of the pin 19, as illustrated in FIGS. 2 and 3. That is to say, the pin 19 may be selectively disposed in either of the apertures 84 and 85. When said pin 19 is disposed in the aperture 84, the casting 83 is rockable about the axis provided by said pin.

Thereby, upon forward movement of the link or rod 78, the gear casting 83 is rotated counterclockwise with respect to FIG. 2 about an axis provided by the pin 19 when disposed in the aperture 84. On the other hand, upon rearward movement of the link 78, the gear casting 83 is rocked clockwise about such axis. To adjust the relative length of the link or rod 78, a conventional length adjustment member 86, as illustrated to the upper left in FIG. 1, is provided on the upper end portion of the rod or link 78. Thereby, an adjustable setting of the relationship of said rod or link 78 and the casting 83 is available.

As clearly illustrated in FIG. 2, the gear teeth 87 of the casting 83 mesh with teeth 88 of a gear casting 89, whereby, upon rocking of the casting 83 clockwise and counterclockwise, the casting 89 is correspondingly rocked counterclockwise and clockwise. The casting 89 has a shaft mounting extension 90 through which the vertical shaft 36 extends. The mounting extension 90 is disposed below the journalling member 37, and is adjustably secured on the vertical shaft 36, as illustrated in FIGS. 2 and 3. A set screw 91 locks the shaft 36 and gear casting 89 in selected relationships. Thereby, adjusted relationships between the casting 89 and the wheel 33 may be established in accordance with desire or requirements. From the foregoing, it is apparent that as the gear 89 is rocked or moved, corresponding motion in the same angular direction about shaft 36 will result in the wheel 33.

The manner in which the device operates will be understood by assuming that a tractor (not seen) is applying a force having a vector in the direction indicated by the arrow 23 to offset implement or trail 11. Assume further that a load factor is developed on the offset trail portion 20 which tends to cause said offset trail portion 20 to drag. Such force will tend to cause the wheels 33 and 34 to rock about vertical axes counterclockwise with respect to FIG. 1. When an increase in force of the nature described is applied on the trail or implement 11, an increase in drawing force is required to be applied by the tractor (not seen) to maintain a uniform forward motion. Such phenomena tend to have the effect of pulling the tongue 48 rearwardly, because of the increased load on the offset frame 20, and pulling the sleeve 52 forwardly, because of the increased tractor-applied force to maintain a uniform forward motion. Both the latter factors tend to drive the link or rod 78 forwardly. Thereby, the gear 83 is rocked counterclockwise about the axis of the pin 19 when disposed in the aperture 84, and the gear 89 is rocked clockwise about the vertical shaft 36. Such clockwise motion or rotation of the gear 89 tends to rock the wheel 33 clockwise about the shaft 36, thereby overcoming the tendency to rock the wheel 33 in an opposite direction caused by the increased load on the offset trail portion 20.

The tendency to adjust the wheel 33 will be translated or transmitted through the rod or link 29, the bracket 25 and the link 31, to the wheel 34 which will rock or tend to rock in the same direction as and with the wheel 33.

Inasmuch as the force applied to push or pull the link 78 forward or backward is the same as the force which tends to cause the side draft, and that such force is translated linearly, it is apparent that the counteracting force will be of the same magnitude as the force tending to cause side draft. Accordingly, to the extent that the force tending to cause side draft develops, a counteracting force of the same magnitude tends to develop.

To facilitate inoperative transport of the device from one location to another, that is to say, assume that the device is required to be drawn down a road in non-operating condition, a lockout may be provided. The details of construction of a lockout for the side draft control mechanism are not shown but the same may be of conventional construction. However, provision is made in casting 83, the aperture 85 of which provides an entry to a lock-out mechanism (not shown) to which the gear 83 can be tied by pin 19 by transfer thereof from aperture 84 to aperture 85.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. In an offset trail and the like, the combination of frame means defining an elongated frame section adapted for forward movement in a path extending normally to the longitudinal axis of said frame section, and a pair of wheels mounted on opposite sides of said frame section in supporting relationship therewith, with a retractible hitch means projected outwardly from said frame means for connection to a trail-drawing vehicle and being extensible in response to dragging forces on said frame section tending to cause side draft; wheel mounting means for adjustment of said wheels about vertical axes, and force-inversion means connecting said wheel mounting means and said hitch means for application to said wheel mounting means of torque corresponding to the extension or contraction of said hitch means to rotate the wheels about vertical axes in reverse directions responsively in a direction countering side draft.

2. The device defined in claim 1 in which said force-inversion means comprises a link having one end portion connected to said hitch means and adapted to move lineally in opposite directions in response to extension and retraction of said hitch means, wheel mount rotating means for converting force transmitted through said link to torque for adjustment of said wheels.

3. In an offset trail and the like, the combination of frame means defining an elongated frame section adapted for forward movement in a path extending normally to the longitudinal axis of said frame section, and a pair of wheels mounted on opposite sides of said frame section in supporting relationship therewith, with a retractible hitch means projected outwardly from said frame means for connection to a trail-drawing vehicle and being extensible in response to dragging forces on said frame section tending to cause side draft; wheel mounting means for adjustment of said wheels about vertical axes, and force-inversion means connecting said wheel mounting means and said hitch means for application to said wheel mounting means of torque corresponding to the extension of said hitch means to rotate the wheels about vertical axes responsively in a direction countering side draft, and in which the force-inversion means comprises a pair of oppositely rotatable coacting members, one of said oppositely rotatable coacting members being connected to said wheel mounting means, and an elongated link having one end portion connected to said hitch means for disposition corresponding to the length of said hitch means and an opposite end portion connected to the other of said oppositely rotatable coacting members for angular disposition thereof corresponding to the disposition of said elongated link, whereby for each position of said hitch means the wheels have a corresponding attitude about vertical axes of rotation.

4. In an offset trail and the like having an elongated frame adapted for forward movement in a path extending normally to the longitudinal axis of said frame, a tongue extending forwardly from said frame and adapted for connection to a trail-drawing vehicle, a pair of wheels mounted on opposite sides of said frame, means providing vertical axes of rotation about which said wheels are rotatable to set trail course, and a mechanism for controlling side draft, said mechanism characterized by force inversion means connected to said tongue for translating the increased force thereto required to be applied by a drawing vehicle to overcome side draft into a torque for the wheels for turning them in reverse directions about vertical axes to counter-balance side draft torque.

5. The device defined in claim 4 in which said means connected to said tongue comprises a self-retracting extensible hitch section mounted on said tongue and having a forward end portion adapted for connection to a trail-drawing vehicle; a force-transmission link having one end portion connected to said self-retracting extensible hitch section; rotatable means connected to said wheels for rotation thereof about vertical axes, said force-transmission link having a second end portion connected to said rotatable means to rock the rotatable means to an attitude corresponding to the aspect of the self-retracting hitch section to correspondingly set the wheels.

6. The device defined in claim 7 in which the rotatable means comprise a pair of coacting gear members rotatable in opposite directions, one of said gears operably connected to said wheels for rotation thereof, the other of said gears operably connected to said force-transmission link and adapted to be rotated thereby in accordance with change of aspect of the self-retracting hitch section.

7. The device defined in claim 4 in which said means connected to said tongue comprises a self-retracting extensible hitch section mounted on said tongue and having a forward end portion adapted for connection to a trail-drawing vehicle; a pair of coacting oppositely rotatable members, one of said oppositely rotatable members operably connected to said wheels for rotation thereof about said vertical axes, said tongue having an aft end portion, the other of said oppositely rotatable members pivotally connected to said aft end portion; a force-transmission link having one end portion connected to said self-retracting extensible hitch section and having a second end portion connected to said other of said oppositely rotatable members for rocking thereof in accordance with change of aspect of the self-retracting hitch section.

8. For an offset trail and the like having an offset frame supported on a pair of opposed wheels and adapted to be drawn by a tongue having opposite end portions arranged in fore-and-aft relationship, a side draft control mechanism comprising a self-retracting extensible hitch member mounted on the forward end of said tongue and adapted for connection to a drawing vehicle; a mount for a first of said wheels defining a vertical axis and rockably connected thereabout to said frame; a pair of oppositely rotating gear members, one thereof having a part connected to said mount for rocking one of said wheels, the other thereof having a portion pivotally connected to aft end portion of said tongue; an elongated link having a forward end portion connected to said hitch member and an aft end portion connected to the other of said gears for rocking the same about its pivotal connection thereby to rock said mount and the first of said wheels in a direction opposite to the direction of rotation of the other of said gears, and force-transmission means connecting the first of said wheels and the other thereof to rock said wheels together.

9. The device defined in claim 1 in which the wheel mounting means comprise a pair of vertical members journalled in said frame means and having angular extensions providing axes of rotation on which said wheels are secured, respectively, one of said vertical members being operably connected to said force-inversion means, and a link means connected to said vertical members for transmission of torque of said force-inversion means from one of said vertical members to the other thereof.

10. The device defined in claim 9 in which said link means comprises a pair of rods having first end portions connected to said vertical members, respectively; a tie, said pair of rods having opposite end portions pivotally connected to said tie for movement of said wheels together.

References Cited
UNITED STATES PATENTS

| | | | |
|---|---|---|---|
| 1,309,368 | 7/1919 | Rarig | 280—443 |
| 2,474,445 | 6/1949 | Vutz | 280—472 X |

LEO FRIAGLIA, *Primary Examiner.*